US006667407B2

(12) United States Patent
Venham et al.

(10) Patent No.: US 6,667,407 B2
(45) Date of Patent: Dec. 23, 2003

(54) PROCESS OF MAKING POLYAZIRIDINES

(75) Inventors: Lanny D. Venham, Oakdale, PA (US);
Douglas A. Wicks, Hattiesburg, MS (US); Karsten Danielmeier, Bethel Park, PA (US); Joseph P. Mandara, Barnegat, NJ (US)

(73) Assignee: Bayer Polymers LLC, Pittsburgh, PA (US)

( * ) Notice: Subject to any disclaimer, the term of this patent is extended or adjusted under 35 U.S.C. 154(b) by 0 days.

(21) Appl. No.: 10/137,805

(22) Filed: May 3, 2002

(65) Prior Publication Data

US 2003/0208033 A1 Nov. 6, 2003

(51) Int. Cl.⁷ ............................................. C07D 203/12
(52) U.S. Cl. ....................................... 548/962; 524/430
(58) Field of Search .......................... 548/962; 524/430

(56) References Cited

U.S. PATENT DOCUMENTS

| | | | | |
|---|---|---|---|---|
| 2,596,200 A | 5/1952 | Bestian | ........................ | 260/239 |
| 3,789,034 A | 1/1974 | Wismer et al. | ...... | 260/77.5 AM |
| 4,025,503 A | 5/1977 | Miksovsky et al. | ..... | 260/239 E |
| 4,563,307 A | 1/1986 | Briden | .................... | 260/239 E |
| 4,656,217 A | 4/1987 | Sugiura et al. | ............. | 524/430 |
| 5,106,993 A | 4/1992 | Kania | .......................... | 548/967 |

*Primary Examiner*—Joseph K. McKane
*Assistant Examiner*—Kamal Saeed
(74) *Attorney, Agent, or Firm*—Joseph C. Gil; Thomas W. Roy

(57) ABSTRACT

The invention relates to a process for reducing the monomeric aziridine content in a polyaziridine forming reaction mixture by adding to the polyaziridine forming reaction mixture an excess of an isocyanate scavenger wherein the excess is based on the equivalent ratio of scavenger to monomeric aziridine, an to a product obtained by this process and to a coating composition containing the product obtained by the process.

16 Claims, No Drawings

PROCESS OF MAKING POLYAZIRIDINES

BACKGROUND OF THE INVENTION

The invention relates to a process for reducing monomeric aziridines in a polyaziridine reaction by adding an isocyanate as a scavenger, the products obtained by that process and coating compositions prepared from these products.

Polyfunctional aziridines have been shown to be useful as crosslinking agents in various types of waterborne and solventborne coating systems such as carboxylated acrylics, vinyl-acetate, carboxylated urethanes such as polyurethane dispersions (PUDs), styrene acrylics or mixtures thereof.

One important subclass of commercially available polyfunctional aziridines includes reaction products of ethylene imine (EI, aziridine) or propylene imine (PI, methyl aziridine) with trimethylol propane triacrylate (described for example in U.S. Pat. No. 2,596,299 to Bastian). Other commercially important polyfunctional aziridines can be prepared from ethylene imine or propylene imine and pentaerythritol triacrylate. Other polyfunctional aziridines are based on alkoxylated polyols.

Another method of preparing polyfunctional aziridines includes the transesterification of methyl(1-aziridinyl) propionates with polyols catalyzed with tertiary amines (as described in DE 2334656 to Miksovsky), whereby the methyl(1-aziridinyl)propionates are prepared from monomeric aziridines.

Ethylene imine and propylene imine are volatile low molecular weight toxic compounds which are undesired residuals in the processes to form polyfunctional aziridines. The residual monomeric aziridine compound has to be removed sometimes tediously by elaborate distillation methods or lengthy aging processes. This is especially true, if the reaction temperature is low, which is sometimes necessary to avoid discoloration or viscosity problems. Sometimes the residue can exceed 1000 ppm in raw reaction mixtures. It is very desirable to reduce this amount for a commercial product below 500 ppm and even more preferred to reduce it below 100 ppm or ultimately below 10 ppm.

To drive the Michael-type addition reaction of the aziridine and the acrylate to completion, it is possible to use an excess of aziridine. A disadvantage of this approach is the amount of aziridine to be removed from the reaction product under vacuum. With a simple distillation column and a vacuum of about 50 mm Hg it is usually not possible to remove the aziridine level to below 300 ppm on a commercial time scale, for example in a day. To achieve an aziridine level below that, it is necessary to use refined equipment, like an expensive falling-film or wiping-film evaporator, or longer distillation times which is economically unfavorable. Another method to drive the Michael addition uses an excess of acrylate. The residual aziridine levels can thereby be reduced to less than 10 ppm, which sometimes require considerable aging times up to several months, which again is economically unfavorable.

It is an object of the present invention to provide an easy process for making polyfunctional aziridines without advanced and expensive distillation or cleaning steps. It is another object of the invention to obtain these polyfunctional polyaziridines rheological stable and with a low color. It is another object of the invention to develop a process that results in less than 10 ppm of monomeric aziridine without incurring elaborate vacuum steps or long batch or aging times.

The present invention uses a scavenger. The reactions between electrophiles and aziridines have been described in detail in the literature. One example of a suitable electrophile is an isocyanate.

U.S. Pat. No. 3,789,034 to Wismer et al discloses the preparation of aziridine-functional polymers by preparing an aziridine-diisocyanate adduct and then reacting such adduct with hydroxy-bearing polymers. The aziridine-diisocyanate adduct is prepared, for example, by reacting a diisocyanate with 1,2-propylene imine in such a ratio so as to "half-block" the diisocyanate. Such a reaction does not lead solely to half-blocked products but also to full-blocked products and residual unreacted diisocyanate.

U.S. Pat. No. 4,563,307 to Briden discloses the preparation of aziridine polymers involving the reaction of an isocyanate with an active hydrogen-containing aziridine.

U.S. Pat. No. 5,106,993 to Kania discloses specific aziridine compounds which can be prepared, for example, by reacting a monoisocyanate with an aziridine.

None of the above disclosures however describes the present invention

SUMMARY OF THE INVENTION

The invention relates to a process for reducing monomeric aziridines in a polyaziridine forming reaction mixture by adding to the polyaziridine forming reaction mixture an excess of a isocyanate scavenger, wherein the excess is based on the equivalent ratio of scavenger to monomeric aziridine.

The invention also relates to a product obtained by that process and a coating composition containing the product obtained by the claimed process.

DETAILED DESCRIPTION OF THE INVENTION

Various aziridines and substituted aziridines can be used to form polyfunctional aziridines. The suitable aziridines are well known in the art and generally correspond to the formula

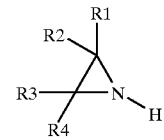

where $R_1$, $R_2$, $R_3$, and $R_4$ independently represent hydrogen; alkyl with up to about 20 carbon atoms, preferably methyl, ethyl, or propyl; aryl, preferably phenyl; alkaryl, preferably tolyl or xylyl; or aralkyl, preferably benzyl or phenethyl.

The groups $R_1$–$R_4$ may represent substituted radicals wherein the substituents include cyano, halo, amino, hydroxy, alkoxy, carbalkoxy, and nitrile. Suitable examples of substituted groups $R_1$, $R_2$, $R_3$, and $R_4$ thus include cyanoalkyl, haloalkyl, aminoalkyl, hydroxyalkyl alkoxyalkyl, carbalkoxyalkyl, and similar substituted derivatives of aryl, alkaryl and aralkyl groups.

Specific examples of suitable aziridines include ethylenimine (aziridine), 1,2-propylenimine (2-methyl aziridine), 2-ethyl aziridine, 1,2-dodecylenimine (2-decyl aziridine), 1,1-dimethyl ethylenimine (2,2-dimethyl aziridine), phenyl ethylenimine (2-phenyl aziridine), tolyl ethylenimine (2-(4-methylphenyl)aziridine), benzyl ethylenimine (2-phenylmethyl aziridine), 1,2-diphenyl ethylenimine (2,3-diphenyl aziridine), hydroxyethyl ethylenimine (2-(2-hydroxyethyl)aziridine), aminoethyl ethylenimine (2-(2-aminoethyl)aziridine), 3-chloropropyl ethylenimine (2-(3- chloropropyl)aziridine), p-chlorophenyl ethylenimine (2-(4-chlorophenyl)aziridine), methoxyethyl ethylenimine (2-(2-methoxyethyl)aziridine), dodecyl aziridinyl formate (dodecyl 1-aziridinyl carboxylate), carbethoxyethyl ethylenimine (2-(2-carbethoxyethyl)aziridine).

Because of their availability and because they have been found to be among the most effective, the preferred aziridines are ethylenimine, 1,2-propylenimine and 2 ethylaziridine.

The suitable aziridines are usually reacted with acrylates.

Preferred acrylates are polyacrylates having a functionality f≧2, which can be synthesized e.g. by an esterification reaction between a polyol and acrylic acid. However, other methods are also possible to synthesize those polyfuctional acrylates. Examples of polyols used in this kind of polyacrylate synthesis include neopentyl glycol, 2,2'-bis(p-hydroxy-phenyl)propane (bis-phenol A), bis(p-hydroxyphenyl)methane (bis-phenol F), glycerol, trimethylolpropane, pentaerythritol and others. It is also possible to use diols commonly used in polyester synthesis. Examples of these diols include ethylene and propylene glycol, butandiol, hexanediol and others.

It is also possible but less preferred to react the monomeric aziridine with monoacylates e.g. esters of acrylic and methacrylic acid and subsequently perform an optionally base catalyzed transesterification reaction.

The reaction temperature in the Michael-addition between the acrylate and the aziridine is above the melting point of the components and below 100° C. Reactions at room temperature will usually work well. It is preferred to react between 0 and 60° C., more preferred between 25 and 50° C. Theoretically higher temperatures can be applied, but are not preferred. It is also possible to run the reaction under pressure with or without elevated temperatures, if suitable equipment is available, which is less preferred. Typically the monomeric aziridine is added to the acrylate over a period of time to control the exothermic reaction. The reaction is then performed in the above mentioned temperature range. Typically the reaction time is less then 24 hours, but will vary with batch size. It is also possible to add the acrylate to the monomeric aziridine, however this is less preferred. In either case, at the end of the reaction the monomeric aziridine level is usually less than 1000 ppm, for example in the range between 100 ppm and 1000 ppm. In cases where the monomeric aziridine level is significantly higher it is possible to apply a weak vacuum (around 50 mm Hg) and use a distillation column to reduce the monomeric aziridine level into the above mentioned range. However, to further reduce the monomeric aziridine content sophisticated vacuum equipment or very long application times are necessary.

To reduce the level of monomeric aziridine to below 10 ppm according to one embodiment of the invention an excess of a suitable isocyanate scavenger is added to the reaction mixture, wherein the excess is based on the equivalent ratio of scavenger to monomeric aziridine. The invention uses an equivalent ratio of residual monomeric aziridine to scavenger of more than 1:1 to 10:1, preferably 1:1 to 5:1, more preferably 1:1 to 3:1. In one embodiment of the invention the ratio is as low as 1:1.01. If the residual amount in the polyaziridine forming reaction mixture is between 200 and 1000 ppm usually 0.01 and 2% by wt of the scavenger based on the reaction mixture is sufficient. Preferred amounts of scavenger are between 0.05 and 1.5% by wt., more preferred between 0.1 and 1.0% by wt., and most preferred between 0.15 and 0.6% by wt.

The monomeric aziridine-scavenger-reaction can be performed at ambient temperature. Since the reaction is exothermic a means for constantly cooling the reaction can be optionally employed.

The scavenger is generally added dropwise into the reactor containing the polyaziridine forming reaction mixture. The reactor is usually equipped with a condenser, a stirring means and a temperature measuring device. The reaction time for this reaction is usually less than 24 hours. If the acrylate in this reaction is a polyacrylate then the reaction is finished, however, if the acrylate is a monoacrylate a transesterification reaction can be performed afterwards. In this less preferred case it is possible to perform the Michael-reaction first, then the transesterification reaction and finally the scavenging reaction.

Scavengers are compounds that react fast with aziridines. Several classes of compounds fit this description. In the context of the invention it is also desirable that the resulting mixtures of the polyaziridine and the reaction product of the aziridine and the scavenger are useful for coatings applications in that they have appropriate properties including color stability and rheological stability. Additionally, suitable scavengers in the context of the present invention do not release acidic by-products. Examples of suitable scavengers include isocyanates.

Suitable isocyanates include monoisocyanates, diisocyanates and polyisocyanates. The isocyanates which are used in the instant invention can be an aliphatic or aromatic isocyanates. Aliphatic polyisocyanates are preferred since it has been found that these provide better color stability in the resultant coating. Monoisocyanates will scavenge the monomeric aziridine. However they are not preferred because the final product of this embodiment of the present invention does not crosslink the polymer but leads to undesired chain termination. In certain occasions a mixture of diisocyanate and monoisocyanate might be appropriate to use. Polyisocyanates can be used in place of or in combination with diisocyanates and/or monoisocyanate. Special attention has to be given to the fact that the average functionality of the reactants and the scavenger used is important in controlling the tendency of the polymer to gel. If higher functional polyisocyanates are used as scavengers it might be favorable to reduce the average functionality of the scavenger by having monofunctional isocyanates and/or difunctional isocyanates present and thus avoid possible gelation.

Examples of polyisocyanates include adducts obtained by modification of aliphatic, cycloaliphatic araliphatic or aromatic diisocyanates. The adducts are known and prepared from at least two diisocyanate molecules and have urethane, uretdione, isocyanurate, allophanate, biuret, acylurea, iminooxadiazindione and/or oxadiazintrione groups. Suitable adducts include those described in J. Prakt. Chem. 336 (1994) 185–200, DE-A 16 70 666, DE-A 19 54 093, DE-A 24 14 413, DE-A 24 52 532, DE-A 26 41 380, DE-A 37 00 209, DE-A 39 00 053, DE-A 39 28 503, EP-A 336 205, EP 339 396 and EP 798 299. These adducts can be made water-soluble or water-dispersible by suitable modifications known in the art. Preferred adducts have a low viscosity and good solubility in polyaziridines. The use of triisocyanates such as 4-isocyanatomethyl-1,8-octanediisocyanate (nonanetriisocyanate), 1,6,11-undecanetriisocyanat or higher functional isocyanates or mixtures thereof is also possible.

Suitable diisocyanates include those having a molecular weight of 140 to 400 with aliphatic, cycloaliphatic araliphatic or aromatic isocyanate groups such as 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6- diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexan (isophoronediisocyanate, IPDI), 4,4'-biisocyanatodicyclohexylmethane, 1-isocyanato-1-methyl-4 (3)isocyanatomethylcyclohexane, bis-(isocyanatomethyl)-norbornane, 1,3- and 1,4-bis-(2-isocyanato-prop-2-yl)-benzene (TMXDI), 2,4- und 2,6-diisocyanatotoluene (TDI), 2,4'- and 4,4'-diisocyanatodiphenylmethane, 1,5-diisocyanatonaphthalene.

Substituted organic isocyanates can also be used in which the substituents are nitro, chloro, alkoxy and other groups which are not reactive with hydroxyl groups or active hydrogens, provided that the substituents are not positioned to render the isocyanate group unreactive and do not act as nucleophiles and open the aziridine rings or cause polymerization or self polymerization of aziridine rings.

Suitable monoisocyantes used preferably to mix with the di- or polyisocyanates include monoisocyanates having aliphatic, cycloaliphatic, araliphatic or aromatic isocyanate groups (including butylisocyanate, cyclohexylisocyanate, phenylisocyanate).

In the present invention diisocyanates and polyisocyanates are preferred, more preferred is the use of diisocyanates and most preferred is the use of isophorone diisocyanate.

It is of course also possible to add mixtures of scavengers (e.g. different isocyanates). Some of the scavengers can also be mixtures of different stereo- and regioisomers.

It can be useful to add a stabilizer to the reaction mixture. It is preferred to use tertiary amines, more preferred the use of aliphatic tertiary amines and especially preferred is the use of tetramethylethylene diamine (TMEDA). Other additives e.g. antioxidants, rheology modifier, light stabilizer among others can be added as necessary for the final application, if they are not nucleophilic or acidic in nature.

It is possible to add the stabilizer to the reaction mixture before, during or after the reaction.

The scavenger can be added with or preferred without solvent or solvent mixtures, however preferred solvents are non-nucleophilic and non-acidic in nature. In general, it is preferred to add the scavenger or the mixture of scavengers neat without solvent.

Catalysts that enhance the reactivity of the scavenger are usually not necessary. Preferred catalysts are non-nucleophilic and non-acidic in nature.

The products prepared by the present invention can be used in all known polyaziridine applications, including use as cross-linkers, in adhesive applications, in coating compositions and in inks and printing compositions, in the field of photography, thermal and electrostatic imaging, fiber and fabric treatment and other uses.

The invention is further illustrated but is not intended to be limited by the following examples in which all parts and percentages are by weight unless otherwise specified.

EXAMPLES

Production of Polyaziridine (I)

4800 lbs trimethylolpropane triacrylate were charged to a reactor and 17 lbs 4-methoxyphenol were added as an inhibitor against free radical polymerization. 2 lbs triethylamine were added to the reactor to maintain basic conditions.

An excess of 10% molar excess of propylene imine (2-methylaziridine) was then added slowly over 10–12 hours, while keeping reaction temperature at 35–40° C.

After all of the propylene imine was added, the temperature was maintained around 37.5° C. for about 9 hours. Some propylene imine was removed by distillation at around 50 mm Hg for 7 hours.

The polyaziridine product contained about 270 ppm of residual propylene imine.

The examples below were compared by mixing at room temperature 0.5 grams or less of the scavengers listed with 100 grams of polyaziridine I. The resulting products were clear, slightly viscous liquids.

This dramatically lowered the PI content from about 270 ppm to less than 10 ppm. The modified polyaziridine was unaffected in terms of physical properties and application properties.

| Ex. # | Scavenger | Scavenger Weight | Initial PI (ppm) | Final PI (ppm) | Appearance |
|---|---|---|---|---|---|
|  |  | Grams | LC-MS | LC-MS |  |
| 1 | Allophanate mod. isocyanate trimer* | 0.38 | 268 | 5 | few gel particles bulk material clear |
| 2 | IPDI | 0.15 | 268 | <1 | clear |
| 3 | HDI | 0.17 | 268 | 2 | clear |
| 4 | H12MDI | 0.26 | 268 | <1 | clear |
| Comp 1 | Benzoyl chloride | 0.50 | 268 | 4 | hazy |
| Comp 2 | Phthalic anyhyride | 0.50 | 268 | n.d. | did not dissolve |

*Sold as Desmodur XP 7100 by Bayer Corporation

The examples also show that not all possible scavengers result in coatings that are commercially usable, but that the claimed scavengers have excellent results.

Physical Property Comparison

The physical properties of the composition according to the invention was comparable to the unscavenged composition.

| Property | Polyaziridine (I) | Example 2 |
|---|---|---|
| Viscosity | 459.5 | 509.0 |
| Density | 1.065 | 1.067 |
| Color | 1 | 1 |
| Solubility | 87.4 F | 84.6 F |
| % N | 8.60 | 8.78 |
| % Aziridine | 95.5 | 97.7 |
| Aziridine, meq/g | 6.15 | 6.28 |

Application Testing

Example 2 above was compared to the unmodified Polyaziridine (I) in coatings applications. The formulations were prepared by mixing the following components. Films were drawn down onto steel panels and baked at 90° C. for 10 min.

| Components | A Wt. (grams) | B Wt. (grams) |
|---|---|---|
| Neo Rez 940 | 10 | 10 |
| Polyaziridine (I) | 0.4 | 0 |
| Example 3 | 0 | 0.4 |

-continued

| Components | C Wt. (grams) | D Wt. (grams) |
|---|---|---|
| Water | 1.26 | 1.26 |
| Neo Rez 9637 | 10 | 10 |
| Polyaziridine (I) | 0.4 | 0 |
| Example 3 | 0 | 0.4 |
| Water | 2.9 | 2.9 |

NeoRez R-940 is an acid-functional aqueous colloidal dispersion of an aromatic urethane supplied by Avecia.

NeoRez R-9637 is an acis-functional high-solids, aliphatic, water-borne urethane dispersion supplied by Avecia.

The physical properties of the coatings prepared from the composition according to the invention is comparable to the coatings prepared from the unscavenged composition.

| Formulation | DFT | MEK Rubs | FA | FABR | FMR |
|---|---|---|---|---|---|
| A | 1.2 | 320 | clear | good | good |
| A | 1.3 | 400 | clear | good | good |
| A | 1.3 | 400 | clear | good | good |
| B | 1.33 | 400 | clear | good | good |
| B | 1.25 | 400 | clear | good | good |
| B | 1.5 | 400 | clear | good | good |
| C | 1.3 | 400 | clear | good | good |
| C | 1.33 | 400 | clear | good | good |
| C | 1.47 | 400 | clear | good | good |
| D | 1.3 | 400 | clear | good | good |
| D | 1.3 | 400 | clear | good | good |
| D | 1.23 | 400 | clear | good | good |

DFT = dry film thickness;
DG = down glossed;
MEK rubs = methyl ethyl ketone double mbs
FA = Formulation Appearance
FABR = Film appearance before rubs
FAAR = Film appearance after mbs Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for reducing the monomeric aziridine content in a polyaziridine forming reaction mixture comprising reacting an acrylate component and an aziridine component to form a polyaziridine forming reaction mixture, adding to the polyaziridine forming reaction mixture an excess of an isocyanate scavenger wherein the excess is based on the equivalent ratio of isocyanate scavenger to monomeric aziridine.

2. The process of claim 1 wherein the equivalent ratio of isocyanate scavenger to monomeric aziridine is between 10:1 to 1.01:1.

3. The process of claim 1 wherein the equivalent ratio of scavenger to monomeric aziridine is between 3:1 and 1.01:1.

4. The process of claim 1 wherein the polyaziridine forming reaction mixture has a content of monomeric aziridine between 100 ppm and 1000 ppm.

5. The process of claim 4 comprising adding between 0.05 and 1.5% by weight of the isocyanate scavenger based on the polyaziridine forming reaction mixture.

6. The process of claim 4 comprising adding between 0.1 and 1.0% by weight of the scavenger.

7. The process of claim 4 comprising adding between 0.15 and 0.6% by weight of the scavenger.

8. The process of claim 1 comprising reacting an acrylate component and an aziridine component before adding the scavenger.

9. The process of claim 1 comprising adding a stabilizer to the reaction mixture before, during or after the reaction.

10. The process of claim 9 wherein the stabilizer comprises a tertiary amine.

11. The process of claim 9 wherein the stabilizer is tetramethylethylene diamine.

12. The process of claim 1 comprising reacting the components at a temperature above the melting point of the aziridine compound and below 100° C.

13. The process of claim 1 comprising adding between 0.05 and 1.5% by weight of the isocyanate scavenger based on the polyaziridine forming reaction mixture.

14. The process of claim 1 wherein the scavenger comprises a diisocyanate.

15. The process of claim 1 wherein the scavenger comprises isophorone diisocyanate.

16. The process of claim 1 wherein the scavenger comprises a trimer of hexamethylene diisocyanate having isocyanurate groups.

* * * * *